US011955265B2

(12) United States Patent
Grubl

(10) Patent No.: US 11,955,265 B2
(45) Date of Patent: Apr. 9, 2024

(54) INDUCTIVE COMPONENT

(71) Applicant: SUMIDA COMPONENTS & MODULES GMBH, Obernzell (DE)

(72) Inventor: Martin Grubl, Untergriebach (DE)

(73) Assignee: SUMIDA COMPONENTS & MODULES GMBH, Obernzell (DE)

( * ) Notice: Subject to any disclaimer, the term of this patent is extended or adjusted under 35 U.S.C. 154(b) by 809 days.

(21) Appl. No.: 16/495,190

(22) PCT Filed: Feb. 21, 2018

(86) PCT No.: PCT/EP2018/054203
§ 371 (c)(1),
(2) Date: Sep. 18, 2019

(87) PCT Pub. No.: WO2018/172004
PCT Pub. Date: Sep. 27, 2018

(65) Prior Publication Data
US 2021/0280350 A1 Sep. 9, 2021

(30) Foreign Application Priority Data
Mar. 23, 2017 (DE) ......................... 102017204949.9

(51) Int. Cl.
*H01F 17/04* (2006.01)
*H01F 1/113* (2006.01)
*H01F 41/02* (2006.01)

(52) U.S. Cl.
CPC ........... *H01F 17/043* (2013.01); *H01F 1/113* (2013.01); *H01F 41/0246* (2013.01); *H01F 2017/048* (2013.01)

(58) Field of Classification Search
CPC .................... H01F 17/043; H01F 1/113; H01F 2017/048
See application file for complete search history.

(56) References Cited

U.S. PATENT DOCUMENTS 1,748,993 A 3/1930 Purdy
5,243,308 A * 9/1993 Shusterman ......... H03H 1/0007 333/185

(Continued)

FOREIGN PATENT DOCUMENTS

CA 2532771 A1 * 7/2006 ............. H01F 27/06
CN 1384968 A 12/2002

(Continued)

OTHER PUBLICATIONS

Japanese Office Action in corresponding Japanese application No. 2019-552140; 4 pages.

(Continued)

*Primary Examiner* — Jeffrey T Carley
(74) *Attorney, Agent, or Firm* — Fattibene and Fattibene, LLC; Paul A. Fattibene

(57) ABSTRACT

The present invention provides an inductive component (1*a*) in several illustrative embodiments and a method for producing such an inductive component. The inductive component (1*a*) comprises a bus bar (4*a*) and at least one magnetic core (6*a*) which is formed along a section of the bus bar (4*a*) and surrounds the bus bar (4*a*) in that section at least in part, wherein the at least one magnetic core (6*a*) is formed as a plastic-bonded magnetic core or a core made of magnetic cement.

7 Claims, 3 Drawing Sheets

(56) References Cited

U.S. PATENT DOCUMENTS

| | | | | | |
|---|---|---|---|---|---|
| 5,455,552 | A * | 10/1995 | Metsler | H01F 27/29 | 336/83 |
| 5,838,216 | A * | 11/1998 | White | H01G 4/35 | 333/182 |
| 5,875,541 | A | 3/1999 | Kumeji et al. | 29/602.1 | |
| 6,106,893 | A * | 8/2000 | Uchikoba | H01F 17/06 | 427/407.1 |
| 6,696,638 | B2 | 2/2004 | Esquerra et al. | 174/35 MS | |
| 6,879,237 | B1 | 4/2005 | Viarouge et al. | 336/229 | |
| 7,142,081 | B1 * | 11/2006 | Shudarek | H01F 37/00 | 336/178 |
| 2004/0145442 | A1 | 7/2004 | Matsutani et al. | 336/200 | |
| 2007/0040640 | A1 | 2/2007 | Ohno et al. | 336/83 | |
| 2008/0012674 | A1 | 1/2008 | Sano et al. | 336/83 | |
| 2010/0085778 | A1 | 4/2010 | Saito et al. | 363/20 | |
| 2010/0097169 | A1 | 4/2010 | Earle | 336/175 | |
| 2012/0223797 | A1 * | 9/2012 | Won | H01F 27/306 | 336/170 |
| 2014/0266555 | A1 * | 9/2014 | Krishnamoorthy | H01F 3/10 | 336/216 |
| 2014/0326499 | A1 | 11/2014 | Ohashi | H02G 5/06 | |
| 2015/0357109 | A1 | 12/2015 | Nobusaka et al. | H01F 27/10 | |
| 2016/0126006 | A1 | 5/2016 | Ahn et al. | H01F 27/2804 | |
| 2016/0172310 | A1 * | 6/2016 | Zhai | H01L 24/20 | 257/659 |
| 2016/0189849 | A1 | 6/2016 | Lee | H01F 27/2804 | |
| 2016/0322152 | A1 | 11/2016 | Ohashi | H01F 27/24 | |
| 2016/0365192 | A1 * | 12/2016 | Ohdaira | H01F 27/266 | |
| 2017/0032883 | A1 | 2/2017 | Hong et al. | H01F 27/2804 | |
| 2018/0049314 | A1 * | 2/2018 | Amaducci | H05K 1/0216 | |
| 2018/0167046 | A1 | 6/2018 | Schliewe et al. | H03H 1/0007 | |
| 2019/0206611 | A1 * | 7/2019 | Matsumoto | H01F 17/04 | |

FOREIGN PATENT DOCUMENTS

| | | | | |
|---|---|---|---|---|
| CN | 110223828 | A * | 9/2019 | H01F 17/06 |
| DE | 2248534 | | 7/1973 | |
| DE | 19721610 | | 11/1998 | |
| DE | 69323383 | T2 | 6/1999 | |
| DE | 102007007117 | | 8/2008 | |
| DE | 102008028196 | | 12/2009 | |
| DE | 202016104468 | | 8/2016 | |
| DE | 102015110142 | | 12/2016 | |
| EP | 0593020 | A1 * | 10/1993 | H01F 1/057 |
| EP | 1381061 | | 1/2004 | |
| EP | 1833063 | | 9/2007 | |
| EP | 1833063 | A1 * | 9/2007 | H01F 17/06 |
| EP | 2034498 | | 3/2009 | |
| EP | 2911295 | A1 * | 8/2015 | H01F 17/06 |
| EP | 3089178 | | 11/2016 | |
| EP | 3089178 | A1 * | 11/2016 | H01F 17/06 |
| JP | H0463409 | A | 2/1992 | |
| JP | H05-015619 | | 2/1993 | |
| JP | H05-015629 | | 2/1993 | |
| JP | H05160662 | | 6/1993 | |
| JP | H06-011315 | U | 2/1994 | |
| JP | H07202452 | | 8/1995 | |
| JP | 2000340437 | | 12/2000 | |
| JP | 2010131768 | | 6/2010 | |
| JP | 2014082738 | | 5/2014 | |
| JP | 2014138012 | | 7/2014 | |
| JP | 2016195208 | | 11/2016 | |
| WO | WO 91/17556 | | 11/1991 | |

OTHER PUBLICATIONS

Chinese Office Action in corresponding Chinese application No. 201880019775.X, with partial English translation; 13 pages.

International Search Report for corresponding International Application no. PCT/EP2018/054203, dated Jun 7, 2018; 6 pages with English translation.

Japanese Office Action in counterpart Japanese application No. 2019-552140 dated Mar. 31, 2021; 4 pages.

Chinese Office Action and English translation in counterpart Chinese application No. 201880019775.X dated Apr. 15, 2021; 10 pages.

EPO Communication and English translation in counterpart EPO application No. 18708353.0 dated Oct. 15, 2021; 16 pages.

Office Action in English in counterpart German application No. 10 2017 204 949.9 dated Feb. 6, 2023; 12 pages.

* cited by examiner

INDUCTIVE COMPONENT

FIELD OF THE INVENTION

The present invention relates to an inductive component with a bus bar and a method for producing an inductive component with a bus bar. Particular applications of the invention relate to a high-current filter with such an inductive component.

BACKGROUND OF THE INVENTION

Electromagnetic compatibility (EMC) is today an indispensable quality feature of electronic equipment. This is particularly evident in the fact that EMC in national Member States of the European Union is reflected in national EMC legislation and regulations in accordance with an EMC directive issued by the European legislator back in 1996 so that new electronic devices introduced into the European market have to comply with these directives and laws in terms of EMC.

An electronic device is there not only understood to mean a ready-to-use device intended for the end user, but also electronic assemblies with their own function, which are manufactured in series and not intended exclusively for the installation in a specific stationary system or a specific ready-to-use device for the end user, are to be included in the term “device”. Although elementary components such as capacitors, coils and EMC filters are excluded from the current EMC directive, this does not apply to assemblies composed of elementary components.

In one approach to EMC compliance, noise is filtered using suitable filters. In electrical engineering, a distinction is made in terms of so-called lead-related interference between differential mode noise and common mode noise. Differential mode noise is understood to be interference voltages and currents on the connecting leads between electrical assemblies or electrical components which propagate in opposite directions on the connecting leads and superimpose signals that propagate in the same direction as signals on connecting leads. By contrast, common mode noise is understood to be interference voltages and currents on the connecting leads between electrical assemblies or electrical components which propagate with the same phasing and current direction, both on the outgoing lead as well as on the return lead between these components. Analysis and avoidance of this noise takes place in the context of electromagnetic compatibility.

In general, differential mode noise coupled into circuits can be caused by inductive couplings (time-varying magnetic flux or alternating current lines in the vicinity). In cases where the noise occupies frequency ranges that differ from wanted signals, sufficient noise suppression can be obtained by the use of suitable filters, in particular push-pull filters or D-mode chokes. Line filters include, for example, filter elements against high-frequency differential mode noise. So-called high-current filters are used especially in high-current applications and are specially designed for the suppression in high-current applications. Examples are high-current filters for the suppression in frequency converters, power electronics and collective suppression at high power in wind turbines and industrial plants.

Known solutions for D-mode filters are limited to large installation spaces and allow for only simple bus bar geometries, where the bus bar has to be fixated by additional components. Since a large part has to be done manually in known production processes, industrial production is relatively expensive. Furthermore, the design of the bus bars strongly depends on the ability to install D-mode filters, so that specific applications must be taken into account in the design of bus bars and often lead to design conflicts.

A bus bar filter for use as an EMC filter is shown in document DE 10 2015 110142 A1 in which several interconnected inductances and capacitors are provided on several bus bars for filtering differential mode noise. Cores formed as a single piece or composed of i-cores, each with an air gap, are placed on bus bars. The cores are formed from magnetically soft ferrite material.

A choke assembly for a power converter device is known from document DE 19721610 A1 in which a bus bar and a core assembly with core coil wrapped around it are embedded in a housing in an insulating cast.

Document DE 10 2007 007117 A1 discloses an inductive component in which two coils, each formed by a winding and a respective core, are formed and are potted with magnetic filling material, for example, plastic ferrite material, in a housing.

In view of the above-mentioned drawbacks, there is a demand for simplification of industrial manufacture and greater flexibility in the design of known D-mode filters, as well as a reduction of producing costs.

SUMMARY OF THE INVENTION

The above-mentioned problems and objects are solved and satisfied by an inductive component according to according to one embodiment and a method for producing an inductive component according a second embodiment. Advantageous embodiments thereof are defined in dependent claims.

The invention proposes as a solution, for example, that the discrete core elements used in known D-mode filters, for example, configured as snap-on cores (in particular snap-on ferrites) or ring/frame cores made of metal powder, be replaced with plastic-bonded cores which are provided by injection-molding or potting from plastic ferrite material or plastic material with magnetic particles embedded therein, or replaced with magment cores which are formed by so-called magnetic cement or “magment”, where magnetically-conductive particles are embedded in a cement matrix.

This allows for a greater freedom in the design of bus bars, as restrictions imposed by considerations that are enforced with regard to the installability of the cores of D-mode filters, are eliminated and an attachment of bus bars with plastic-bonded cores can be easily integrated. In addition to complex bus bar geometries or complex geometries of bus bar shapes, this makes it possible to also provide D-mode filters for compact installation spaces in automated processes. In addition to the good industrial producibility, production costs are therefore also reduced.

Provided in one first aspect of the present invention are an inductive component with a bus bar and at least one magnetic core which is formed along one section of the bus bar and surrounds the bus bar in that section at least in part, wherein the at least one magnetic core is formed as a plastic-bonded magnetic core or a core made of magnetic cement. Herein, the inductance of the inductive component is determined by the at least one magnetic core, regardless of a shape of the bus bar, by the magnetic core and the bus bar. This is very advantageous for chokes.

The term “magnetic core” is to be understood to mean a component part of the inductive component which, together with the bus bar as an electrical conductor, forms an inductance.

In one advantageous configuration of the inductive component according to the first aspect, exposed end sections of the bus bar in the inductive component are formed according to a first embodiment as connecting contacts and at least one bus bar section exposed between the magnetic core and a terminal is further formed for the electrical connection to a capacitor.

In one further advantageous configuration of the inductive component according to the first aspect, the inductive component according to a second embodiment further comprises a housing, in which the bus bar is accommodated at least in part, where the at least one magnetic core is formed in the housing as a plastic-bonded magnetic core by plastic injection-molding technology or plastic potting technology.

In one further advantageous configuration of the inductive component according to the first aspect, the inductive component in a third embodiment further comprises at least one second magnetic core which is formed as a plastic-bonded magnetic core or a core made of magnetic cement and which surrounds the bus bar at least in part, where the two magnetic cores are arranged along the bus bar in series and a bus bar section is formed between each two magnetic cores for the electrical connection to a capacitor.

In a more illustrative configuration of the third embodiment, the inductive component further comprises a housing in which the bus bar is accommodated at least in part, where the at least two magnetic cores are formed in the housing in separate housing sections.

In one further advantageous configuration of the inductive component according to the first aspect, the magnetic core as a plastic-bonded magnetic core in the inductive component according to a fifth embodiment is formed of plastic ferrite material or of a plastic material with magnetically-conductive particles embedded therein.

Provided in a second aspect of the present invention are a high-current filter with at least one capacitor and the inductive component according to the first aspect, where the at least one capacitor is electrically connected to the bus bar.

In a third aspect of the present invention, a method for producing an inductive component is provided. According to illustrative embodiments herein, the method comprises providing a bus bar and forming at least one magnetic core which is formed along one section of the bus bar and surrounds the bus bar in that section at least in part, where the at least one magnetic core is formed as a plastic-bonded magnetic core or a core made of magnetic cement.

In a first embodiment of the third aspect, forming the at least one magnetic core comprises insert molding the bus bar with plastic ferrite material or plastic material with magnetically-conductive particles embedded therein, where at least one plastic-bonded magnetic core is formed.

In one embodiment of the third aspect, the bus bar is at least in part arranged in a housing and forming the at least one magnetic core comprises potting the bus bar at least in part in the housing with a plastic ferrite material or plastic material with magnetically-conductive particles embedded therein or a cement with magnetically-conductive particles embedded therein.

The above-described first to third aspects of the invention provide an inductive component and a method for producing an inductive component, respectively, where plastic-bonded magnetic cores or magnetic cores made of magnetic cement can make use of installation spaces much better than known discrete cores.

BRIEF DESCRIPTION OF THE DRAWINGS

Further advantages and features of the present invention will become apparent from the following more detailed description of the accompanying drawings in which.

DETAILED DESCRIPTION OF THE PREFERRED EMBODIMENTS

A circuit diagram of a high-current filter according to some illustrative embodiments of the present invention shall now be described with reference to FIG. 1. High-current filter T comprises an input terminal E and an output terminal A, as well as terminals n1 and n2 which are electrically connected to a ground terminal M. This is no restriction of the invention and a connection to a fixed reference potential other than ground can be provided instead of ground terminal M.

Three inductances L1, L2 and L3 are connected in series between the input terminal and the output terminal. Interposed between input terminal E and inductance L1 is a capacitance C1, where one electrode of capacitance C1 is connected between input terminal E and inductance L1, while the other electrode of capacitance C1 is connected to ground M. Interposed between inductance L1 and inductance L2 is a capacitance C2, where one electrode of capacitance C2 is connected between inductances L1 and L2, and the other electrode of capacitance C2 is connected to ground M. Interposed between inductance L2 and inductance L3 is a capacitance C3, where one electrode of capacitance C3 is connected between inductances L2 and L3, and the other electrode of capacitance C3 is connected to ground M. Interposed between inductance L3 and output terminal A is a capacitance C4, where one electrode of capacitance C4 is connected between inductance L4 and output terminal A, while the other electrode of capacitance C4 is connected to ground M.

According to illustrative examples herein, it can be true that C1=C2=C3=C4. Alternatively, at least one capacitance of capacitances C1 to C4 can be different.

According to one illustrative example, it can be true that C1≈C2≈C3≈C4, wherein "≈" means a deviation of at most 30%, for example, at most 20%, preferably at most 15%, more preferably at most 10%, approximately at most 5%.

Figure 1:
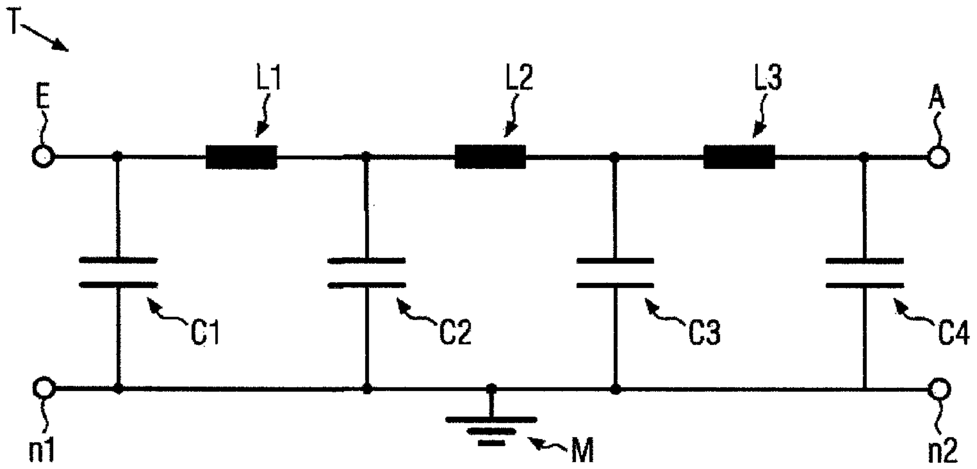
FIG. 1 illustrates schematically a circuit diagram of a high-current filter according to some illustrative embodiments of the present invention.

Circuit T shown schematically in FIG. 1 forms, for example, an LC low-pass filter of higher order, where several LC filters are connected in series between input terminal E and output terminal A. For example, it is true for a second-order LC filter that a potentiation of an attenuation/decade to the power of "2" is reached with a certain attenuation/decade ("attenuation per decade" or "attenuation edge") per LC filter in a series connection of two LC filters. With an attenuation edge of, for example, X dB/decade per order assumed for a illustrative example, in general (X dB/decade)$^n$ arises for an $n^{th}$-order filter (a series connection of n LC filters) for the entire attenuation edge, in other words, an exponentiation to the power of "n"

The circuit diagram shown in FIG. 1 represents, for example, an LC low-pass filter of the third order, where capacitance C1 represents an input capacitance and the first order is formed by inductance L1 with capacitance C2 between inductance L1 and ground M, the second order by inductance L2 with capacitance C3 between inductance L2 and ground M, and the third order by inductance L3 with capacitance C4 between inductance L3 and ground M. It can be ensured by way of the input capacitance (presently capacitance C1), for example, that the series connection of the LC filters (L1, C2), (L2, C3) and (L3, C4) on the side of input terminal E and output terminal A receives a low impedance to Mass M, where the filtering effect on the side of input terminal E is increased (since also capacitance C1 to ground M is present in addition to further capacitances C2 to C4). Furthermore, capacitance C1 can provide a short circuit for possible inductances (not shown), which can be connected on the input side to the input terminal and can be connected upstream thereof (this avoids unwanted series impedance of inductances connected to the input terminal and inductance L1).

The circuit diagram shown in FIG. 1 is no restriction of the present invention and a general circuit topology can be provided where a number n1 (n1≥1) of inductances L1, L2, . . . , Ln1 and a number n2 (n2≥1) of capacitances C1, . . . , Cn2 is provided. For example, instead of the circuit in FIG. 1, a first-order LC filter can be provided by (n1, n2)=(1, 1) or (n1, n2)=(1, 2). For illustrative examples of general circuits it can be true that: (n1, n2)=(n1, n1), where n1=n2, or (n1, n2)=(n1, n1+1), where n2=n1+1.

Various illustrative embodiments of the invention shall be described in more detail below with reference to FIGS. 2*a*, 2*b* and 3.

Figure 2A:
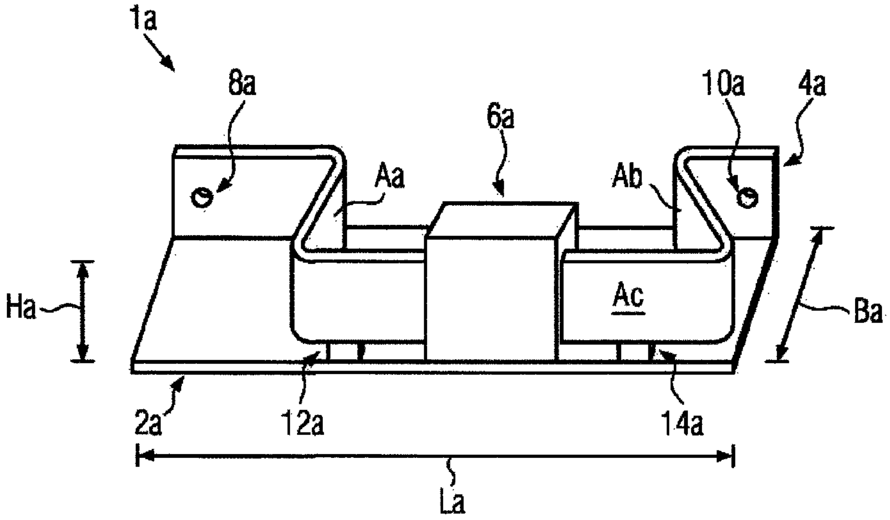
FIGS. 2*a* and 2*b* illustrate schematically in perspective views inductive components according to some alternative illustrative embodiments of the present invention.

FIG. 2*a* represents an inductive component according to some illustrative embodiments of the present invention. Inductive component 1*a* comprises a bus bar 4*a* and a plastic-bonded magnetic core 6*a* which is formed along a section of bus bar 4*a* and surrounds bus bar 4*a* in that section at least in part.

According to illustrative examples herein, plastic-bonded magnetic core 6*a* is formed from a plastic ferrite or comprises a plastic matrix into which magnetically-conductive particles are embedded. An example of a plastic matrix are thermoplastic materials. According to specific illustrative examples of the invention, polyamides, PPS or duroplastic material, such as epoxy resins, can be used as matrix material for plastic-bonded magnetic cores. The magnetically-conductive particles can be formed from a ferrite powder and/or a powder of magnetic rare earth materials, for example, NdFeB.

The term "bus bar" in this specification is to be understood as follows: The term "bus bar" designates an electrical conductor which is configured for operation with a current intensity of at least 5 A (depending on the application, bus bars can be configured for applications of more than 10 A, preferably more than 15 A, for example in a range of 20 A to 1000 A) and/or which is formed as a solid body which can deform only irreversibly (this is to be understood in comparison to a normal wire or power cable which can be deformed reversibly, for example, when wound, provided that it is not kinked. In one illustrative embodiment, the cross-section of a bus bar can be based on the maximum allowable current density determined by the cooling connection and adjoining components and, according to some illustrative examples, be more than 1 $A/mm^2$, preferably more than 3 $A/mm^2$, for example in a range of 4 $A/mm^2$ to 20 $A/mm^2$.

Bus bar 4*a* at its ends comprises contact regions 8*a* and 10*a*, where plastic-bonded magnetic core 6*a* is arranged above bus bar 4*a* and along bus bar 4*a* between contact regions 8*a* and 10*a*.

According to illustrative embodiments, as shown schematically in FIG. 2*a*, bus bar 4*a* can be arranged on a carrier 2*a*, for example, a plastic carrier or directly on a printed circuit board. For this purpose, holding elements 12*a*, 14*a* can be provided for mounting bus bar 4*a* on carrier 2*a*. Holding elements 12*a* and 14*a* are provided at sections of bus bar 4*a* which are respectively not covered by plastic-bonded magnetic core 6*a*, and therefore represent exposed bus bar sections. Holding elements 12*a*, 14*a* are preferably arranged between plastic-bonded magnetic core 6*a* and contact regions 8*a*, 10*a* along bus bar 4*a*.

According to illustrative examples, holding elements 12*a* and 14*a* can further act as contact elements which are adapted to provide an electrical connection between bus bar 4*a* and a printed circuit board (corresponding to carrier 2*a* or in addition to carrier 2*a*). Additionally or alternatively, holding elements 12*a* and 14*a* can act as contact elements which electrically connect bus bar 4*a* to discrete electrical components, for example, to capacitors and/or additional inductances. For example, a parallel connection of further components to plastic-bonded magnetic core 6*a* can be effected by way of holding elements 12*a* and 14*a* acting as contact elements.

Contact regions 8*a* and 10*a* are generally configured to provide electrical contact between bus bar 4*a* and further bus bars (not shown) electrically connected upstream or downstream, respectively, and/or electric or electronic components (not shown) electrically connected upstream and/or downstream. In other words, contact regions 8*a* and 10*a* represent exposed end sections of bus bar 4*a* which are formed as connecting contacts and at least one bus bar section (described later) exposed at least in part between plastic-bonded magnetic core 6*a* and contact region 8*a* or 10*a*, which can further be adapted for the electrical connection to e.g. a capacitor (not shown).

In specific illustrative examples, as shown in FIG. 2*a*, contact regions 8*a* and 10*a* comprise through-holes which pass through bus bar 4*a* at least in part and are adapted to receive a screw member (not shown) to enable the mechanical and electrical coupling of contact regions 8*a* and 10*a* by way of the screw member to further bus bars and/or electrical and/or electronic components. Additionally or alternatively, contact regions 8*a* and 10*a* can comprise further elements (not shown), which are configured to connect bus bar 4*a* to further bus bars (not shown) and/or electrical and/or electronic components (not shown), for example by way of a plug connection, a crimp connection and the like.

Inductive component 1*a* shown schematically in FIG. 2*a* has a width dimension Ba, a length dimension La and a height dimension Ha According to illustrative examples, the length dimension La can be ≥1 cm, preferably be in a range between 3 and 6 cm, for example, in a range between 3.5 and 5 cm, for example, at 4 cm±0.5 cm. According to illustrative examples, the width dimension Ba can be ≥1 cm, preferably be in a range between 3 and 8 cm, for example, in a range between 3.5 and 5 cm, for example, at 4 cm±0.5 cm. According to illustrative examples, the height dimension Ha is greater than or equal to 1 cm, and can fulfill the relationship: Ha<La+Ba. Furthermore according to specific examples herein, Ha<max (La; Ba) {"Ha is smaller than the larger of La and Ba").

The inductive component 1*a*, which is shown schematically in FIG. 2*a*, can be formed as follows. At the beginning, bus bar 4*a* is provided. According to illustrative examples, bus bar 4*a* can be selected corresponding to an installation space into which inductive component 1*a* is to be installed. Additionally or alternatively, bus bar 4*a* can be selected according to the inductive properties that inductive component 1*a* has to exhibit, for example, a length of bus bar 4*a* in a non-deformed state (a length parallel to the length dimension La) and/or a width dimension of bus bar 4 a (a width parallel to the width dimension Ba in FIG. 2*a*) according to an available installation space and/or the inductive properties of inductive component 1*a* to be set.

Thereafter, selected bus bar 4*a* is subjected to deformation to define a shape of bus bar 4*a* that can depend on available installation space and/or inductive properties that inductive component 1*a* has to exhibit. For example, the bus bar can be bent, so that inductive component 1*a* can be fitted in an available installation space and/or special connection geometries can be produced. For example, a shape of the bus bar determined by an installation situation in a terminal can require that deformation of the non-deformed initial bus bar is to occur in accordance with the particular shape and that e.g. sections bent to a U-shape are to be formed, that connection conditions or connection geometries must be fulfilled and/or that the bus bar is to be fitted in a predetermined installation space. Although parasitic capacitances are generally undesirable and generally to be suppressed, it is nevertheless also conceivable to additionally or alternatively deform the bus bar in order to set a desired capacitance value of the bus bar, for example, by deforming the bus bar in sections such that e.g. sections of the bus bent to a U-shape are adapted to set a parasitic capacitance.

In an illustrative example, as shown in FIG. 2*a*, a U-shaped section is formed by sections Aa, Ab, and Ac. Sections Aa and Ab are arranged substantially parallel to each other ("substantially" means a deviation of sections Aa and Ab from a parallel orientation by at most 30° relative to each other), where the substantially parallel sections Aa and Ab are electrically and mechanically connected by a connecting section Ac extending transverse to sections Aa and Ab. Plastic-bonded magnetic core 6*a* is arranged according to the illustration in sections above connecting section Ac. By suitable selection of sections Aa, Ab and Ac with respect to their surface dimensions and length dimensions ("length dimensions" are to be understood to be dimensions along the width dimension Ba and the length dimension La), a desired connection geometry is realized and/or bus bar 4*a* is fitted into in a predetermined Installation space. Additionally or alternatively, a desired capacitance of bus bar 4*a* can be set based on the shape of bus bar 4*a*. Depending on a specific installation situation or connection geometry, respectively, it is also possible in further illustrative examples which are not shown that several U-shaped sections, for example in serpentine form, are formed between contact regions 8*a* and 10*a* of bus bar 4*a*. However, more complex shapes or geometries of bus bar 4*a* are also conceivable in order to adapt the bus bar to predetermined connections depending on the application, e.g. connect two terminals at a given length of the bus bar, and/or provide procedural manufacturability.

Due to these factors, complex bus bar shapes can arise that can be easily populated with plastic-bonded magnetic cores according to the present method, as shall be discussed below.

Thereafter, plastic-bonded magnetic core 6*a* is formed on bus bar 4*a*. For example, plastic-bonded magnetic core 6*a* can be formed by overmolding bus bar 4*a* with plastic ferrite material or generally material comprising a plastic matrix with magnetically-conductive particles embedded therein. Alternatively, plastic-bonded magnetic core 6*a* can be formed by potting bus bar 4*a* in sections with a potting material, where the potting material comprises a plastic matrix with magnetic particles embedded therein.

Thereafter, respectively obtained bus bar 4*a* with plastic-bonded magnetic core 6*a* can be attached to a carrier 2*a* (for example, a plastic carrier or a printed circuit board).

Additionally or alternatively, bus bar 4*a* with plastic-bonded magnetic core 6*a* can be accommodated in a housing, provided that bus bar 4*a* has not already been arranged in a housing for the production of plastic-bonded magnetic core 6*a*.

An inductive component 1*b* shall be described with reference to FIG. 2*b* according to some illustrative embodiments of the present invention which are alternatives to the embodiments described above with respect to FIG. 2*a*.

Figure 2B:
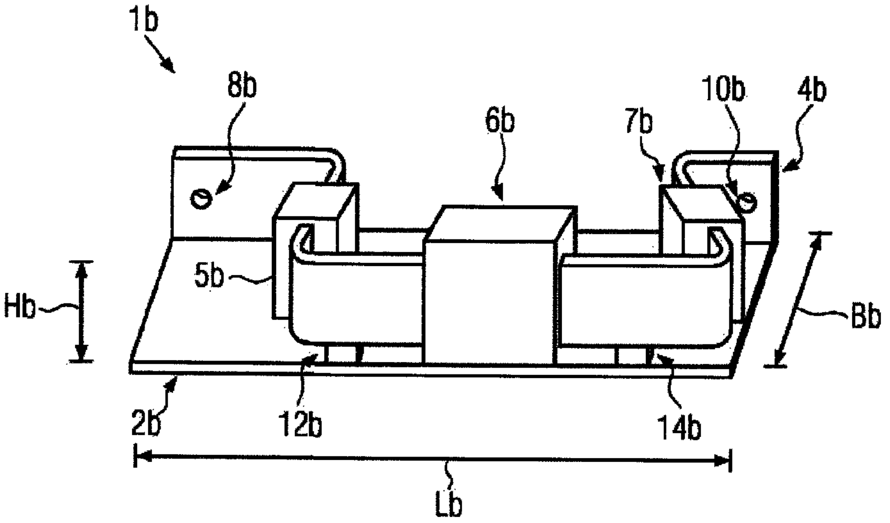

Inductive component 1*b* illustrated in FIG. 2*b* comprises a bus bar 4*b* and three plastic-bonded magnetic cores 5*b*, 6*b* and 7*b* which are each formed along a section of bus bar 4*b* and surround bus bar 4*b* at least in part in the respective section.

According to illustrative examples herein, each plastic-bonded magnetic core 5*b*, 6*b* and 7*b* is formed from a plastic ferrite or comprises a plastic matrix into which magnetically-conductive particles are embedded. An example of a plastic matrix are thermoplastic materials. According to specific illustrative examples of the invention, polyamides, PPS or duroplastic material, such as epoxy resins, can be used as matrix material for plastic-bonded magnetic cores. The magnetically-conductive particles can be formed from an iron powder, a powder of an iron alloy (e.g., FeSi, NiFe, FeSiAl, etc.), a ferrite powder and/or a powder of magnetic rare earth materials, e.g. NdFeB.

Bus bar 4*a* at its ends comprises contact regions 8*b* and 10*b*, where plastic-bonded magnetic cores 5*b*, 6*b* and 7*b* are arranged above bus bar 4*a* and along bus bar 4*a* between contact regions 8*b* and 10*b*.

According to illustrative embodiments, as shown schematically in FIG. 2*a*, bus bar 4*b* can be arranged on a carrier 2*b*, for example, a plastic carrier or directly on a printed circuit board. For this purpose, at least holding elements 12*b*, 14*b* can be provided to mount bus bar 4*b* on carrier 2*b*. Holding elements 12*b* and 14*b* can each be arranged between two plastic-bonded magnetic cores of plastic-bonded magnetic cores 5*b*, 6*b* and 7*b*.

Holding elements 12*b* and 14*b* are provided in an illustrative manner at sections of bus bar 4*a* which are respectively not covered by plastic-bonded magnetic core 5*b*, 6*b* and 7*b*, and therefore represent exposed bus bar sections. Holding element 12*b* is disposed between plastic-bonded magnetic cores 5*b* and 8*b*, whereas the holding element is disposed between plastic-bonded magnetic cores 6*b* and 7*b*. Further holding elements (not shown) can be provided. For example, another holding element (not shown) can be disposed between plastic-bonded magnetic core 5*b* and contact region 8*b*, and another holding element (not shown) can be disposed between plastic-bonded magnetic core 7*b* and contact region 10*b*.

According to illustrative examples, holding elements 12*b* and 14*b* (as well as the (optional) further holding elements not shown in FIG. 2*b*) can also act as contact elements which are adapted to establish an electrical connection between bus bar 4*b* and a printed circuit board (corresponding to carrier 2*b* or 2*b* or in addition to carrier 2*b*). Additionally or alternatively, holding elements 12*b* and 14*b* can act as contact elements electrically connecting bus bar 4*a* to discrete electrical components, for example, to capacitors and/or additional inductances. For example, a parallel connection of further components to plastic-bonded magnetic cores 5b, 6b and 7b can be effected by way of holding elements 12b and 14b acting as contact elements.

In a specific example, bus bar 4b can be almost completely surrounded by a material for plastic-bonded magnetic cores 5b, 6b, 7b, and only contact regions 8b, 10b and sections can be exposed on the bus bar that are in mechanical (and optionally electrical) contact with holding elements 12b and 14b. If, in this example, holding elements 12b and 14b further act as electrical contact elements by way of which bus bar 4b can be connected in parallel to e.g. discrete electrical components (e.g., a capacitor), then only the surface sections of bus bar 4b to be mechanically and electrically connected to holding elements 12b, 14b may not be covered with plastic-bonded magnetic cores 5b, 6b, 7b between contact regions 8b, 10b. Although in this case plastic-bonded magnetic cores 5b, 8b, 7b represent a contiguous amount of material, effective inductances along the bus bar between contact regions 8b, 10b are provided by holding elements 12b and 14b acting as contact elements, so that three plastic-bonded magnetic cores can effectively be spoken of in this case as well.

Contact regions 8b and 10b are generally configured to provide electrical contact between bus bar 4b and further bus bars (not shown) electrically connected upstream or downstream, respectively, and/or electric and/or electronic components (not shown) electrically connected upstream and/or downstream. In other words, contact regions 8b and 10b represent exposed end sections of bus bar 4b which are formed as connecting contacts and comprise at least one bus bar section (shall be described later), exposed at least in part between plastic-bonded magnetic cores 5b or 7b and a contact region 8b or 10b, which can further be adapted for the electrical connection to e.g. a capacitor (not shown).

In specific illustrative examples, as shown in FIG. 2b, contact regions 8b and 10b comprise through-holes which pass through bus bar 4b at least in part and are adapted to receive a screw member to enable the mechanical and electrical coupling of contact regions 8b and 10b by way of the screw member (not shown) to further bus bars and/or electrical and/or electronic components. Additionally or alternatively, contact regions 8b and 10b can comprise further elements (not shown) which are configured to connect bus bar 4b to further bus bars (not shown) and/or electrical and/or electronic components (not shown), for example by way of a plug connection, a crimp connection and the like.

Inductive component 1b shown schematically in FIG. 2b has a width dimension Bb, a length dimension Lb and a height dimension Hb. According to illustrative examples, the length dimension Lb can be ≥1 cm, preferably be in a range between 3 and 6 cm, for example, in a range between 3.5 and 5 cm, for example at 4 cm±0.5 cm. According to illustrative examples, the width dimension Bb can be ≥1 cm, preferably be in a range between 3 and 6 cm, for example in a range between 3.5 and 5 cm, for example at 4 cm±0.5 cm. According to illustrative examples, the height dimension Hb is greater than or equal to 1 cm, and can fulfill the relationship: $Hb<Lb+Bb$. According to specific examples herein, it can be true that $Hb<\max(Lb; Bb)$ ("Hb is less than the larger of Lb and Bb").

The inductive component 1b, which is shown schematically in FIG. 2b, can be formed as follows. In the beginning, bus bar 4b is provided. According to illustrative examples, bus bar 4b can be selected corresponding to an installation space into which inductive component 1b is to be installed. Additionally or alternatively, bus bar 4b can be selected according to the inductive properties that inductive component 1b has to exhibit, for example, a length of bus bar 4b in a non-deformed state (a length parallel to the length dimension Lb and/or a width dimension of bus bar 4b (a width parallel to the width dimension Bb in FIG. 2b) according to an available installation space and/or the inductive properties of inductive component 1b to be set.

Thereafter, selected bus bar 4b is subjected to deformation to define a shape of bus bar 4b that can depend on available installation space and/or that can exhibit specific connection geometries. For example, a shape of the bus bar determined by an installation situation in a terminal can require that the deformation of the non-deformed initial bus bar is to occur in accordance with the particular shape and that e.g. sections bent to a U-shape are to be formed, that connection conditions or connection geometries must be fulfilled and/or that the bus bar is to be fitted in a predetermined installation space It is also conceivable that a deformation of the selected bus bar can depend on inductive properties that inductive component 1b has to exhibit. For example, the bus bar can be bent such that inductive component 1b can be fitted in an available installation space. For example, several U-shaped sections, for example in serpentine form, can be formed between contact regions 8b and 10b in bus bar 4b (not shown in FIG. 2b). But more complex shapes or geometries of bus bar 4b are also conceivable. Depending on a specific installation situation or connection geometry, it is also possible in further illustrative examples, which are not shown, that several U-shaped sections, for example in serpentine form, can be formed between contact regions 8b and 10b of bus bar 4b. However, more complex shapes or geometries of bus bar 4b are also conceivable in order to adapt the bus bar to predetermined connections depending on the application, e.g. connect two terminals at a given length of the bus bar, and/or provide procedural manufacturability. Due to these factors, complex bus bar shapes can arise that can be easily populated with plastic-bonded magnetic cores according to the present method, as shall be discussed below.

Thereafter, plastic-bonded magnetic cores 5b, 6b and 7b are formed on bus bar 4b. For example, plastic-bonded magnetic cores 5b, 6b and 7b can be formed by insert molding bus bar 4b with plastic ferrite material or generally material comprising a plastic matrix with magnetically-conductive particles embedded therein. Alternatively, plastic-bonded magnetic cores 5b, 6b and 7b can be formed by potting bus bar 4b in sections with a potting material, where the potting material comprises a plastic matrix with magnetically-conductive particles embedded therein. This is no restriction of the present invention, but some plastic-bonded magnetic cores can also be formed by insert molding, while other plastic-bonded magnetic cores are formed by potting.

Thereafter, respectively obtained bus bar 4b with the plastic-bonded magnetic cores 5b, 6b and 7b can be attached to a carrier 2b (for example, a plastic carrier or a printed circuit board).

Additionally or alternatively, bus bar 4b with plastic-bonded magnetic cores 5b, 6b and 7b can be accommodated in a housing, provided that bus bar 4b has not already been arranged in a housing for the production of plastic-bonded magnetic cores 5b, 6b and 7b.

Further illustrative embodiments of the present invention shall now be described with reference to FIG. 3.

Figure 3:
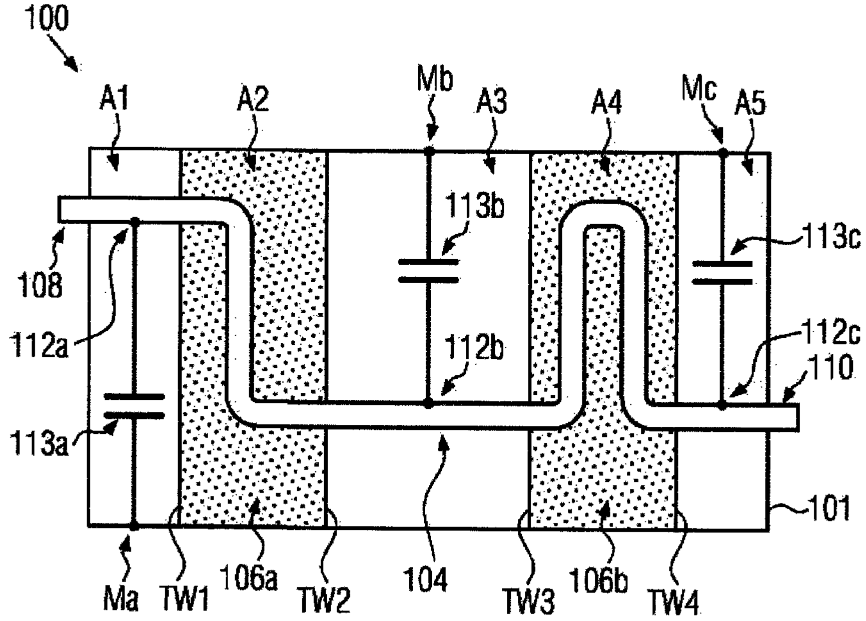
FIG. 3 is a schematic plan view of an inductive component according to further illustrative embodiments of the present invention.

FIG. 3 schematically illustrates a top view onto an inductive component 100 which comprises a housing 101 and a bus bar 104 arranged at least in part in the housing. As shown in FIG. 3, the bus bar can extend into the housing and contact ends 108 and 110 with suitably formed contact regions (not shown) can protrude out of housing 101 to form connecting contacts of bus bar 104.

This is no restriction of the present invention, and bus bar 104 can alternatively be completely accommodated in housing 101 (not shown)

Housing 101 comprises housing sections A1, A2, A3, A4 and A5 which are separate from one another. The number of separate housing sections is arbitrary and can be suitably selected according to an intended application. In the example of the embodiment illustrated in FIG. 3, five housing sections A1 to A5 are formed by partition walls TW1, TW2, TW3 and TW4 formed in the housing. This is no restriction and housing sections within housing 101 can be provided in any manner by way of suitable partition walls. Although partition walls TW1 to TW4 are shown as extending parallel to side walls of housing 101, this is no restriction of the invention and partition walls of any shape, in particular curved partition walls, can also be provided instead of planar partition walls.

Provided in partition walls TW1 to TW4 are recesses (not shown) for receiving bus bar 104 which extends through these recesses (not shown), so that bus bar 104 passes through the various housing sections A1 to A5. The recesses (not shown) in partition walls TW1 to TW4 can be formed in partition walls TW1 to TW4 according to a shape of bus bar 104 (obtained after a deforming process, as previously described with respect to FIGS. 2*a* and 2*b*). Preferably, the recesses and bus bar 104 can be matched to one another in such a way that adjacent housing sections are sealed, despite the recesses, against a potting material by way of bus bar 104 extending in the recesses. This means that when filling potting material into a housing section, preferably no potting material exits through the recess when bus bar 104 is inserted into the recess. A polyamide, PPS or duroplastic material, such as epoxy resin, can be used as the potting material, which can be mixed with an iron powder, a powder of an iron alloy (e.g., FeSi, NiFe, FeStAl, etc.), a ferrite powder and/or a powder of magnetic rare earth materials, e.g. NdFeB, which provides magnetic particles in the potting material.

By potting individual housing sections, housing sections A 2 and A 4 in the example in the illustration in FIG. 3 are potted by way of a potting material comprising a plastic matrix with magnetic particles embedded therein, plastic-bonded magnetic cores can be provided in sections over bus bar 104, such as plastic-bonded magnetic cores 106*a* and 106*b* in the illustration of FIG. 3. In order to provide a desired inductance of plastic-bonded magnetic cores 106*a* and 106*b*, a suitable shape of bus bar 104 can be provided in housing sections A2 and A4, for example, for setting a certain length of bus bar 104 extending in housing sections A2 and A4 which affects the inductance of plastic-bonded magnetic core 106*a* for housing section A2 and of plastic-bonded magnetic core 106*b* for the housing section A4. It is also additionally or alternatively conceivable, to set a desired capacitance value, for example according to a U-shaped section, such as is illustrated e.g. for housing section A4 in FIG. 3, and/or, depending on the application, to adapt bus bar 104 to predetermined terminals, e.g. to connect two terminals at a given length of bus bar 104, and/or to provide process engineering manufacturability. Due to these factors, complex shapes of bus bar 104 can arise which can be easily populated with plastic-bonded magnetic cores, as shall be discussed below.

According to some illustrative embodiments, bus bar 104 in housing section A1 is electrically connected between contact end 108 and plastic-bonded magnetic core 106*a* by way of a contact point 112*a* to a capacitance 113*a* that can be accommodated in housing section A1. Capacitance 113*a*, e.g. a capacitor, accommodated in housing section A1 can further be connected by way of a contact point Ma to a ground line outside housing 101. This is no restriction of the present invention, and capacitance 113*a* can instead also be provided outside housing 101.

According to some illustrative embodiments, bus bar 104 in housing section A3 is electrically connected between contact end 106*a* and plastic-bonded magnetic core 106*b* by way of a contact point 112*b* to a capacitance 113*b*, e.g. a capacitor that can be accommodated in housing section A3. Capacitance 113*b* accommodated in housing section A3 can further be connected by way of a contact point Mb to a ground line outside housing 101. This is no restriction of the present invention, and capacitance 113*b* can instead also be provided outside housing 101.

According to some illustrative embodiments, bus bar 104 in housing section A5 is electrically connected between contact end 110 and plastic-bonded magnetic core 106*b* by way of a contact point 112*c* to a capacitance 113*a* that can be accommodated in housing section A5. Capacitance 113*c*, e.g. a capacitor, accommodated in housing section A5 can further be connected by way of a contact point Mc to a ground line outside housing 101. This is no restriction of the present invention, and capacitance 113*c* can instead also be provided outside housing 101.

According to illustrative embodiments, capacitances 113*a*, 113*b*, and 113*c* can be provided as discrete electrical components respectively accommodated in housing sections A1, A3, and A5. Alternatively, capacitances 113*a*, 113*b* and 113*c* can be provided in a printed circuit board (not shown) or connected to a printed circuit board (not shown), where the printed circuit board (not shown) can represent a base of housing 101 (not shown) or be arranged on the base (not shown) of housing 101, respectively.

Figure 4:
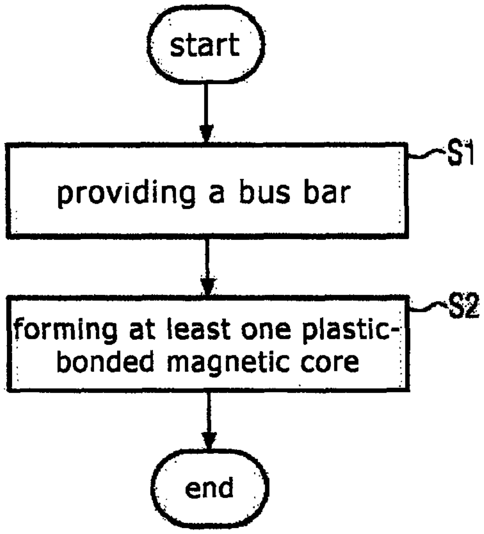
FIG. 4 illustrates a flowchart of a method for producing an inductive component according to illustrative embodiments of the present invention.

An illustrative method for producing an inductive component according to the present invention shall now be described with reference to FIG. 4. In a step S1, a bus bar is provided. The bus bar can be provided in step S1 as explained, for example, with respect to FIG. 2*a* above. The bus bar provided in step S1 has preferably been subjected to deformation prior to step S1 so that the bus bar provided in step S1 has a desired shape (e.g. for adaptation to an installation space in which the bus bar is to be provided, and/or for setting desired electrical properties).

Thereafter, in a step S2, at least one plastic-bonded magnetic core can be formed which is formed according to illustrative embodiments along a section of the bus bar and surrounds the bus bar at least in part in that section.

According to specific illustrative examples herein, the at least one plastic-bonded magnetic core can be formed in step S2 by insert molding the bus bar with a plastic ferrite material, or generally by insert molding the bus bar with a plastic material having magnetically-conductive particles embedded therein.

According to alternative examples herein, the bus bar can be arranged at least in part in a housing between step S1 and step S2. In step S2, the at least one plastic-bonded magnetic core can then be formed by potting the bus bar in the housing at least in sections with a plastic ferrite material or generally a plastic material with magnetically-conductive particles embedded therein. An example of a plastic matrix is thermoplastic materials. According to specific illustrative examples of the invention, polyamides, PPS or duroplastic material, such as epoxy resins, can be used as matrix material for plastic-bonded magnetic cores. The magnetically-conductive particles can be formed from an iron powder, a powder of an iron alloy (e.g., FeSi, NiFe, FeSiAl, etc.), a ferrite powder and/or a powder of magnetic rare earth materials, e.g. NdFeB.

Alternatively, a magnetic core can be formed from magnetic cement in that housing sections are potted with the magnetic cement and the magnetic cement cures.

The bus bar with the at least one plastic-bonded magnetic core is subsequently attached and/or electrically connected to a carrier material, such as a plastic carrier or a printed circuit board.

In specific illustrative embodiments of the present invention, as explained above with reference to FIGS. 2*a*, 2*b*, 3 and 4, a high-current filter can be provided by coupling the inductive component to capacitances, as has been explained above according to the circuit diagram of FIG. 1. A correspondingly formed high-current filter can represent a first-order or higher-order filter, as generally illustrated with respect to FIG. 1.

The inductive component can be provided, for example, in a filter module to filter differential mode noise. According to a suitable deformation of the provided bus bar, also complex bus bar geometries can there be used, since the plastic-bonded magnetic cores provide no restriction of the bus bar shape as compared to known solutions with magnetic cores, which are provided for example by folding ferrites that are folded around or snapped around bus bars, a plastic-bonded magnetic core, as described above with respect to the illustrative embodiments, can better utilize a given space than discrete cores. Filter modules can therefore be manufactured also for compact installation spaces. Manufacturing processes can there be automated or can comprise automated injection-molding processes or potting processes. In processes, in which plastic-bonded magnetic cores are produced by potting, additional fixation of the bus bar by additional components is dispensed with.

The industrial production is improved in this regard due to the foregoing advantages and the great freedom in the design of the bus bar, since there are no restrictions on the design of the bus bar by the requirements in terms of the installability of inductive components.

In specific illustrative embodiments of the present invention, almost entire insert molding of a bus bar can take place for high-current filters with very large cross-sections, where only regions can be excluded to which further components, for example, capacitances, are connected. Alternatively, the almost entire potting of the bus bar can take place instead of the almost entire plastic ferrite insert molding, where an additional mechanical protection of the assembly can be provided by the potting.

Inductances of the plastic-bonded magnetic cores are easily adjustable in a large inductance range by way of the plastic-bonded magnetic cores, for example in a range from 10 nH to 200 nH, preferably in the range from 40 nH to 90 nH or in a range from 150 nH to 300 nH.

Plastic-bonded magnetic cores have been describe above with reference to FIGS. 1 to 3 in which magnetically-conductive particles are embedded in a plastic matrix. This is no restriction of the present invention and magnetically conductive particles can instead also be provided embedded in a cement matrix (so-called magnetic cement or "magment"). The term "plastic-bonded core" in the description for FIGS. 1 to 3 should therefore alternatively also comprise magnetic cement, where dimensions of magnetic cores are in a range greater than 0.5 m, in particular in the range of at least 1 m.

What is claimed is:

1. Inductive component, comprising:

a bus bar, at least one first magnetic core formed along a section of said bus bar and surrounding said bus bar in said section, wherein said at least one first magnetic core is formed as a plastic-bonded magnetic core having magnetically conductive particles in a matrix comprising plastic, at least one second magnetic core which is formed as a plastic-bonded magnetic core having magnetically conductive particles in a matrix comprising plastic and which surrounds said bus bar, wherein said at least two magnetic cores are each formed along discrete sections of said bus bar in series with a bus bar section being formed between each two magnetic cores such that each of said at least two magnetic cores surrounds said bus bar completely in the respective discrete sections, a bend is formed in one of the discrete sections of said bus bar, whereby the bus bar section is capable of electrically connecting to a capacitor via said bus bar section between each two of said magnetic cores, and a housing in which said bus bar is accommodated at least in part, wherein said at least two magnetic cores are formed in said housing in separate housing sections separated by one or more partition walls.

2. Inductive component according to claim 1, wherein exposed end sections of said bus bar have connecting contacts, and wherein at least one bus bar section is exposed at least in part between said magnetic cores, the exposed bus bar section having a terminal in electrical connection with a capacitor.

3. High-current filter with at least one capacitor and said inductive component according to claim 1, wherein said at least one capacitor is electrically connected to said bus bar.

4. An inductive component, comprising:

a bus bar, wherein exposed end sections of said bus bar are formed as connecting contacts;

at least one first plastic-bonded magnetic core having magnetically conductive particles in a matrix comprising plastic, said at least one first plastic-bonded magnetic core completely surrounds said bus bar without a gap along a first section of said bus bar;

at least one second plastic-bonded magnetic core having magnetically conductive particles in a matrix comprising plastic, said at least one second plastic-bonded magnetic core completely surrounds said bus bar without a gap along a second section of said bus bar at a different location than the first section of said bus bar, wherein said at least one first and second plastic-bonded magnetic cores are arranged along said bus bar and an exposed bus bar section is formed between the first section of said bus bar and the second section of said bus bar, the exposed bus bar section configured for electrically connecting to a capacitor, and a bend is formed in one of the first and second sections of said bus bar; and a housing in which said bus bar is accommodated, wherein said at least one first and second plastic-bonded magnetic cores are formed in said housing in separate housing sections formed by partition walls and the separate housing sections are separated by an intermediate housing section, wherein the exposed bus bar section is placed in the intermediate housing section, whereby when filling a potting material into the separate housing sections used for forming said at least one first and second plastic-bonded magnetic cores, the potting material is contained within the separate housing sections that are separated by the intermediate housing section and the exposed bar section is held in the intermediate housing section capable of electrically connecting to the capacitor.

5. Inductive component, comprising:

a bus bar, a first unitary magnetic core formed along a first section of said bus bar and surrounding an entire circumferential surface of said bus bar along the first section, wherein said first unitary magnetic core is formed as a plastic-bonded magnetic core having magnetically conductive particles in a matrix comprising plastic;

a second unitary magnetic core formed along a second section of said bus bar and surrounding an entire circumferential surface of said bus bar along the second section, wherein said second unitary magnetic core is formed as a plastic-bonded magnetic core having magnetically conductive particles in a matrix comprising plastic;

wherein said first and second unitary magnetic cores are each formed along the first and second sections as discrete sections of said bus bar in series, and with a bus bar section being formed between said first and second unitary magnetic cores such that each of said first and second unitary magnetic cores surrounds said bus bar completely around an entire circumferential surface of the bus bar section within the respective discrete sections, and a bend is formed in one of the first and second sections of said bus bar, whereby the bus bar section is capable of electrically connecting to a capacitor via said bus bar section between said first and second unitary magnetic cores;

a housing in which said bus bar is accommodated, wherein said first and second unitary magnetic cores are formed in said housing in separate housing sections separated by partition walls; and wherein the separate housing sections are separated by an intermediate housing section and the separate housing sections are configured so that when filling a potting material into the separate housing sections used for forming said first and second unitary magnetic cores, the potting material is contained within the separate housing sections that are separated by the intermediate housing section and the bus bar section is held exposed in the intermediate housing section capable of electrically connecting to a capacitor.

6. Inductive component according to claim 1, wherein: said bend comprises a U-shape.

7. Inductive component according to claim 1, further comprising:

recesses formed in the partition walls of the separate housing sections, wherein each one of said recesses and said bus bar are matched to one another in such a way that the separate housing sections are sealed.

* * * * *